United States Patent [19]
DeCoene et al.

[11] 3,747,311
[45] July 24, 1973

[54] MECHANISM FOR THE AUTOMATIC ADJUSTMENT OF THE HEADER OF HARVESTING MACHINES

[75] Inventors: Frans J. DeCoene; Marc G. Vansteelant, both of Zedelgem, Belgium

[73] Assignee: Clayson N.V., Zedelgem, Belgium

[22] Filed: Oct. 13, 1971

[21] Appl. No.: 188,835

[52] U.S. Cl. ............................................. 56/208
[51] Int. Cl. .......................................... A01d 67/00
[58] Field of Search ............................. 56/208–217

[56] References Cited
UNITED STATES PATENTS

| | | | |
|---|---|---|---|
| 3,286,448 | 11/1966 | Moore | 56/208 |
| 3,349,549 | 10/1967 | Van Der Lely | 56/208 X |
| 3,088,264 | 5/1963 | Sallee | 56/208 X |

FOREIGN PATENTS OR APPLICATIONS
1,021,619  3/1966  Great Britain ....................... 56/208

Primary Examiner—Louis G. Mancene
Assistant Examiner—J. A. Oliff
Attorney—Joseph A. Brown, John C. Thompson et al.

[57] ABSTRACT

Mechanism for the automatic height adjustment of an agricultural machine part, especially of the header of a harvesting machine, with the property that it mainly consists in the combination of slide shoes, pivotally fixed underneath the header; between the latter and the header elements which try to push these slide shoes away from the header and elements which at any relative displacement between the slide shoes and the header, automatically provide for a new equilibrium position as far as the weight division of the header-straw elevator is concerned.

15 Claims, 7 Drawing Figures

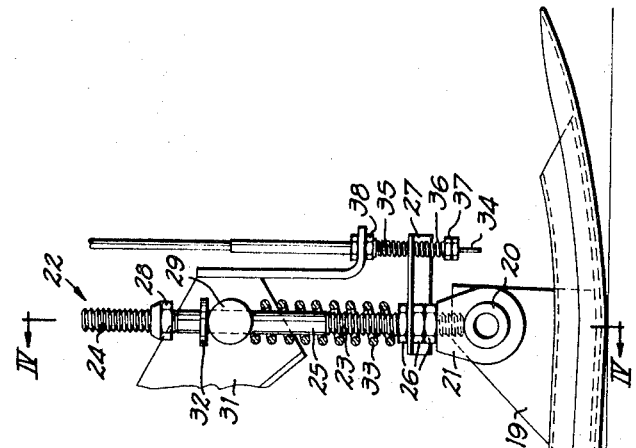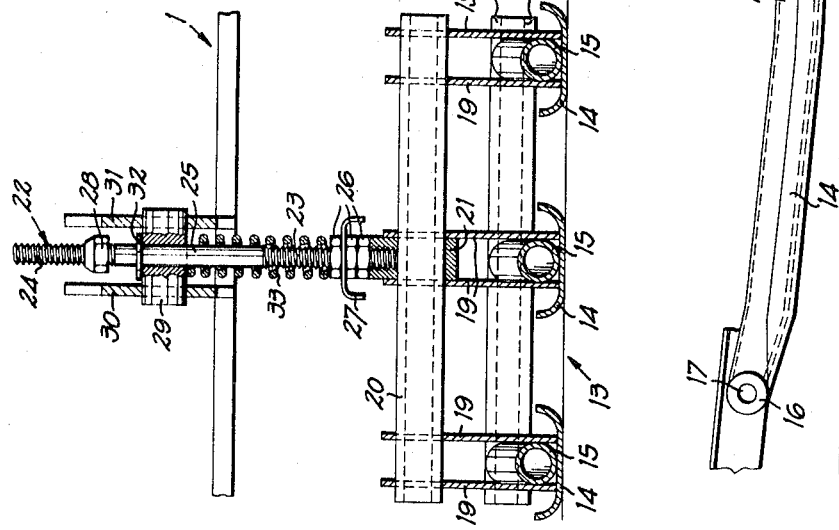

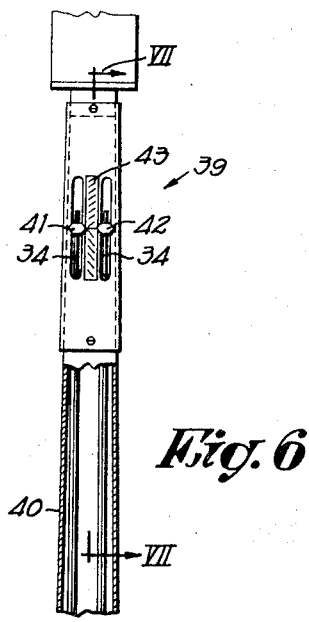
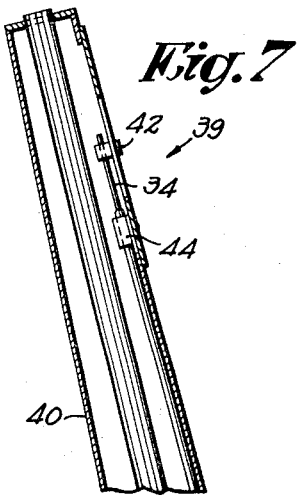
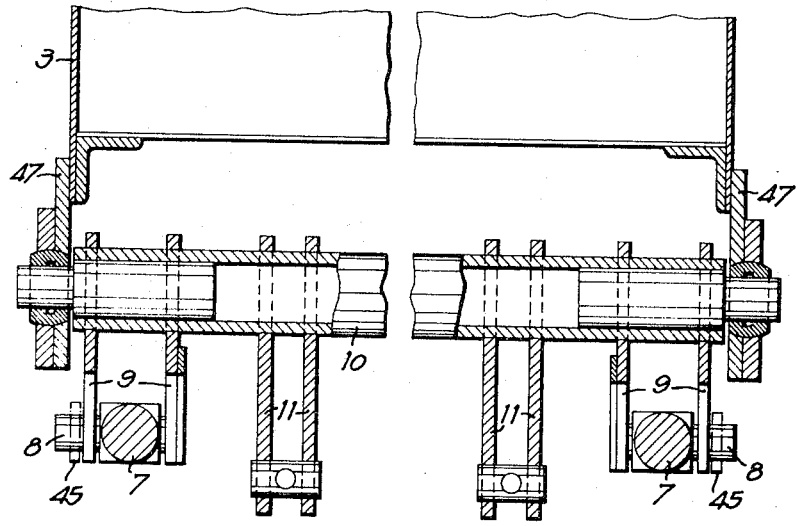

MECHANISM FOR THE AUTOMATIC ADJUSTMENT OF THE HEADER OF HARVESTING MACHINES

FIELD OF THE INVENTION

The present invention deals with an automatic height adjustment of an agricultural machine part especially of the header of harvesting machines for example combines.

DESCRIPTION OF THE PRIOR ART

The prior art discloses mechanisms for the automatic height adjustment for agricultural machines parts for example an automatic header height adjustment for combines.

With the known executions, such an automatic header height adjustment is obtained for example by making use of feeler shoes which are applied underneath the header and which scan the bottom. See for example U.S. Pat. Nos. 2,750,727 and 3,286,448.

These feeler shoes control by way of an electrical or hydraulic means a hydraulic adjusting valve which regulates the oil supply to and from the lifting rams of the header, in other words the cylinders which determine the header height adjustment.

A first disadvantage of these versions is that one always needs an extra hydraulic adjusting valve which is one of the reasons why these executions are relatively expensive.

Another disadvantage is that since the header is relatively a large piece, it forms in this manner a heavy load for the combine hydraulic system, the more since such a combine has to be adjusted many times.

Still another disadvantage of these known executions is that the header can still pick up earth when the bottom's unevenesses show short and relatively steep crossings, since the feeler shoes are applied underneath the header and since a similar large mass cannot be adjusted all of a sudden. The header and especially the cutting mechanism is pushed in this manner the the bottom which can result in plugging ups and even the break of cutting mechanism's parts.

In another know execution, a header part is supported by the machine frame via compression springs by which the header can slide over the ground with a relative low pressure. In one form the compression springs are disposed between the header lift cylinders and the header and examples of this type are shown in U.S. Pat. Nos. 3,238,709 and 3,349,747. In another form the compression springs are applied around the aforesaid lifting rams of the header and this especially between a support on the body of the cylinders on one hand and a support on the extreme end of the corresponding piston rods on the other hand. These piston rods are made telescopically so that it is possible to displace the free extreme ends of these telescopic piston rods and also the header without having the supply or discharge of the oil. Examples of this type are shown in U.S. Pat. No. 3,264,808 and British Pat. Nos. 909,443 and 987,127.

These executions have certain disadvantages, a first disadvantage being that when the header is suddenly placed opposite a relief this header, because of its large inertia mass cannot suddenly move upwards and is nevertheless pushed into these reliefs.

Still another disadvantage is that dependent on the surface condition, the aforesaid compression springs can obtain a less suitable tension by which the pressure of the header on the surface can become very great and consequently by which the good function of the combine is harmed. One knows indeed that dependent on the condition of the surface, the combine wheels more or less sink into the surface by which the function position of the header is also adjusted dependent on the surface condition.

Yet another disadvantage finally is that with larger surface unevenesses, the aforesaid compression springs are subject to strong changeable tensions in other words the header pressure on the surface can vary a lot and in some cases even so much that with a too great surface pressure the top layer of the surface is pushed forwards and piles up in front of the header.

SUMMARY OF THE INVENTION

The present invention deals with an automatic height adjustment especially for the header of harvesting machines such as combines, by which the aforesaid and other disadvantages of the known executions are systematically excluded. One obtains also that the hydraulic lifting system for the header does not have to be controlled continuously by which this hydraulic system is less loaded so that the springs with which a part of the header weight is taken up can be adjusted at each moment and in a very easy manner at its most effective tension and consequently so that the pressure on the surface can be precisely adjusted; that the good compensation working can be checked continuously in a very easy way; for example via suitable indication mechanisms; that the header height compensation is very sensitive and exact; that an inexpensive mechanism is obtained since no special elements are required, but only some elements which are obtainable on the market or either can be constructed in a simple manner and that a very simple and firm mechanism is obtained which does not require maintenance.

The mechanism according to the invention which shows the aforesaid and other characteristics mainly consists in the combination of spring biased slide shoes which are hinged fixed underneath the header; between the latter and the header elements which try to push these slide shoes away from the header and elements which automatically take care of an new equilibrium with each relative displacement between the slide shoes and the header for so far as the weight division of the header straw elevator is concerned.

These and other objects and advantages of this invention will be apparent to those skilled in the art after a consideration of the following detailed description taken in conjunction with the accompanying drawings, in which the preferred form of this invention is illustrated.

BRIEF DESCRIPTION OF THE DRAWINGS

FIG. 3 is a detail view of a portion of FIG. 2.

FIG. 4 is a cross-section according to line IV—IV in FIG. 3.

FIG. 5 is a cross section according to line V—V in FIG. 2.

FIG. 6 is a partial view according to line VI—VI in FIG. 1.

FIG. 7 is a cross-section according to line VII—VII in FIG. 6.

Figure 1:
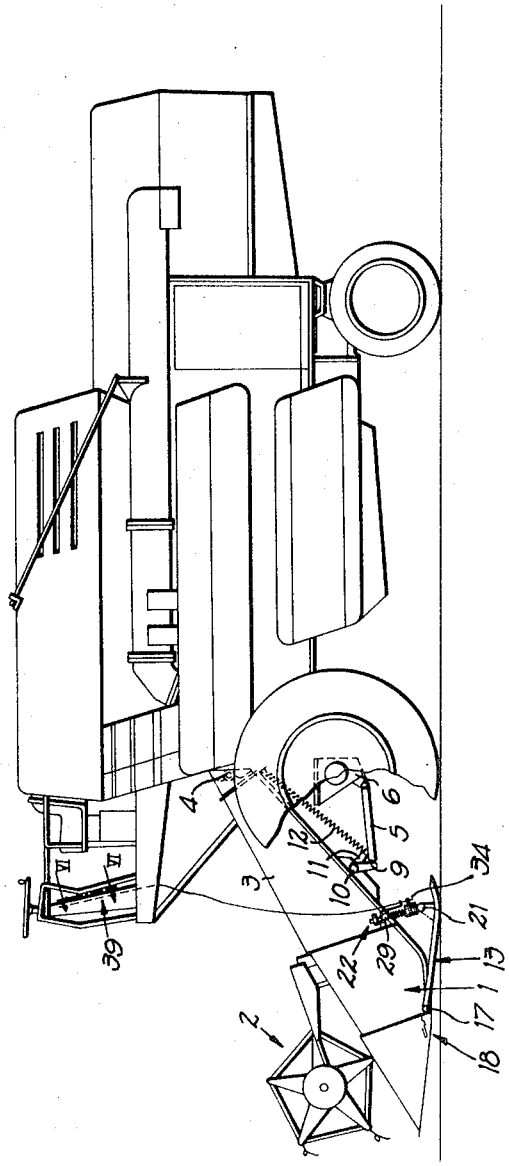
FIG. 1 reflects a schematical side view, with a partial cut-away of a combine on which the improvements are applied according to the present invention.
Figure 2:
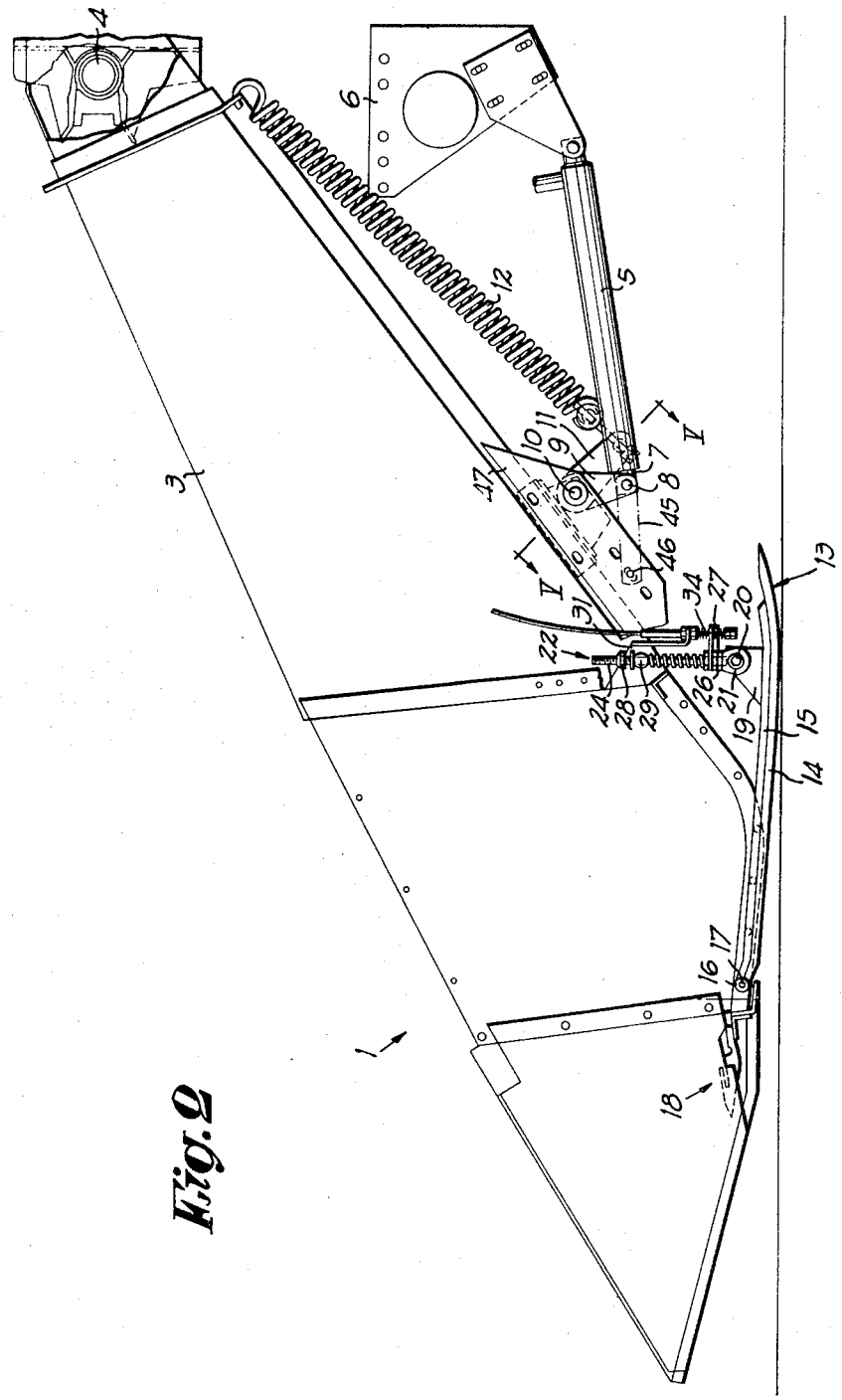
FIG. 2 is a detail view of a portion of FIG. 1.

In the following description right-hand and left-hand reference is determined by standing to the rear of the combine and facing in the direction of travel.

DESCRIPTION OF A PREFERRED EMBODIMENT

As known with a combine, the header 1 with the so called pick-up reel 2 is fixed to the straw elevator 3, by which the entire mechanism (header pick-up reel-straw elevator) is pivotally connected with the machine frame via a pivot 4.

The aforesaid elevator 3 and thus the header 1 are traditionally supported by means of two hydraulic cylinders 5 against the machine frame, the cylinders being directly applied between right and left hand sides of the elevator and machine frame.

According to the invention, these cylinders 5, are fixed at one exteme end in a pivotally manner with a fixed machine frame for example to the supports 6 on the traction axle, while the other extreme end of these cylinders, especially the piston rods 7 thereof, are pivotally connected via a spindle 8 with right and left levers 9 (only the left lever being shown). This last part is firmly connected on a shaft 10 which extends from one side of the machine to the other, by which second levers 11 are fixed on this shaft 10 which levers are adjustably connected in a suitable way with one extreme end of a set of springs 12. The other extreme end of the springs is connected with a higher part of the elevator housing.

Although the levers 9 and 11 are fixed on a common shaft, naturally each lever 9, 11 could be formed out of one part whether or not it is applied on a separate shaft. Because of the parallelism of the system, preference is given so as to let the shaft 10 extend over the entire width of the machine in order to let both mechanisms 5-12 which are placed sidewards, interact equally on the header.

Underneath the header case 1 two slide shoes 13 are applied which are each formed by a number of equally shaped slide members 14 which are each reinforced by a tube shaped element 15 fixed unto it and which extends almost over the entire length of each slide member. The shoes are connected with a tube 16 by a spindle 17 which is applied freely rotatably underneath the header bottom and this preferably as close as possible after the cutting mechanism 18.

Vertical supports 19 are fixed to each shoe 13 and carry at their upper extreme end a rod, tube or the like 20. The eye 21 of a rod 22 is freely rotatable applied around the rod, tube or the like 20. The rod 22 mainly consists of two threaded parts 23 and 24 and a cylindrical part 25 situated between. Via the threaded part 23 and suitable nuts 26 a support 27 is fixed on this rod 22 whilst a nut 28 co-ordinates with the threaded part 24 and which as you will see later forms a stop. The part 25 freely passes through a guide piece 29 which is supported by suitable supports 30, 31 fixed on the header.

Around the cylindrical part 25 of rod 22, a damper 32 for example formed by a rubber ring is applied between the guide piece 29 and the aforesaid nut or stop 28.

Finally between the aforesaid support 27 and the guide piece 29 a compression spring 33 is provided by which the tension of this spring is adjustable through the displacement of the nuts 26.

A drawing pressure cable 34 is fixed with the support 27 of each slide shoe 13. The cable is connected in this case with support 27 via the interference of springs, respectively 35, 36 which are applied between the aforesaid support 27 on one hand, and stops respectively 37 and 38 on the other hand. The covering of the proper drawing pressure cable 34 is fixed with stop 38, by which this stop is further firmly fixed with the aforesaid supports 30 and 31.

The second extreme end of the drawing pressure cable 34 reaches up to the steering platform and more especially up to an indicator 39 which is preferably appied in this execution in the steering column housing 40. The extreme end of each cable on the location of indicator 39 is connected with a pointer respectively 41, 42 which can displace along a common index scale 43 which is applied for this purpose on the steering column housing 40.

The second free extreme end of the aforesaid housing of the drawing pressure cable is firmly fixed in this case, with the steering column housing 40 via a clamp 44.

Finally the mechanism is completed by an extra link 45 at each side pivotally connected with spindle 8 at one end. The other end of link 45 can be secured by fastener 46 with a support 47 which is provided for this purpose underneath the straw elevator.

The operation of the mechanism as described above is very simple and as follows.

In working position, the aforesaid link 45 is not secured to the support 47 on the straw elevator.

The mechanism at this moment is in balance by which a part of the balance of the header and straw elevator is carried through the bottom via compression springs 33 and slide shoes 13. These springs 33 are under a certain compression and the slide shoes 13 rest on the bottom with a certain pressure.

The weight of the header and elevator are further carried by shaft 4 and cylinders 5, by which the rocker arms 9, 11 have taken a certain position so that the springs 12 are also under a certain tension.

When no oil is fed or discharged to the aforesaid cylinder 5, one can consider these cylinders with their piston rods 7 as rods with an unchangeable length.

In case for any reason the force which presses on shaft 10 changes, for example decreases, the balance in the support of the header-straw elevator will be broken by which the unit will automatically move to another equilibrium position. Since normally no oil is fed or discharged to the hydraulic cylinders 5 during the movement, these cylinders do not change in length and can thus only pivot around their point of rotation on the supports 6 on the transmission axle. With the obtained motion of rotation of the cylinders around their point of rotation with supports 6 on the transmission axle, and the turning movement of the header with the straw elevator around pivot 4, one obtains that the springs 12 will contract because the pressure force on shaft 10 is decreased. The new balance position is the one by which the shaft 10 is slightly higher and by which the springs 12 have obtained a shorter length. One obtains thus that the header can be displaced without having the oil being supplied or discharged.

The force which acts on shaft 10 depends on the pressure of the header which rests on the ground. This force is thus dependent from the obstacles which are encountered by slide shoes 13. When these slide shoes 13 encounter an obstacle they will be practically instantaneously pressed-in by which the springs 33 are pressed together and by which the equilibrium in the mechanism is distributed. The header encounters at this moment a greater upward pressure from the springs 33 which are pressed together by which the force which acts on shaft 10 decreases and by which as a consequence fully described above, the elevator with the header is moved to a higher equilibrium position. Through this one obtains that the contact surfaces with the bottom are immediately displaced when encountering a hindrance, and that the earth of the hindrance is no longer pushed forward which is not the case with the executions which are provided with fixed slide shoes. The header with its large inertia mass is also displaced with a small slowdown on the slide shoes. This slowdown however no longer forms a disadvantage with the mechanism according to the invention as it obviously appears from what precedes. One obtains also that the header together with the springy slide shoes seem to glide over the obstacles.

The operation of the mechanism, as described above, is applicable whenever a surface elevation is encountered. Naturally, the mechanism will operate in an opposite but similar manner when a depression in the surface is encountered.

It is obvious that the mechanism can only perform properly when the average header pressure on the surface is judiciously chosen. In other words, in case this pressure is too great, the slide shoes 13 will be pushed in their upper position by which these can be considered as fixed toward the header, with all relating unfavorable consequences thereof.

On the other hand when the said surface pressure is too small, the surface unevenesses will no longer be followed by the header.

In order to obtain a decent performance of the mechanism according to the invention, the springs 33 have to be adjusted as such that in front of the middle position of the slide shoes 13 between the extremes, the spring tension of these springs 33 corresponds with the most ideal bottom pressure and on the other hand the cylinders 5 also have to be adjusted as such that the springs 12 obtain the most suitable tension by which the average position of the slide shoes during the operation is also the middle position between the two extremes. This last adjustment which determines the ideal compensation operation can be checked continuously by means of the indication mechanisms 41, 42.

From a practical point of view, the slide shoes will constantly wobble around their middle position between the two extremes when the adjustment of the cylinders 5 is ideal. This is made obvious on indicator 39 by which the indicators 41, 42 in this position wobble in accordance around a middle position.

In case these indicators are in their highest position, this means that the slide shoes are entirely pushed upwards, since the pressure of the header on the ground is too big. The driver knows that he has to supply oil to the cylinders 5 in order to obtain a proper compensation. In case the indicators are situated in a lower position one has to operate in the reverse manner and the driver will drop the header.

One obtains in this manner that the good compensation operation can be checked continuously and in case necessary, be moved to its ideal working position by controlling the hydraulic header lifting system. Indeed this ideal working position can move dependent on more than one factor as amongst others the surface condition, by which thus a single adjustment is not always sufficient.

The aforesaid springs 35, 36 which are applied around cable 34 on the location of the fixation to the rod 22 dampen the movement of indicators 45, 42 by which they indicate in a smaller degree the changes in the condition of the bottom surface but show better the average position of slide shoes 13 during the operation.

When 1 is to be disconnected, one will apply part 45 first between spindles 8 and 46 in order to prevent the elevator 3 from suddenly moving upwards under the influence of springs 12 which then have to carry a smaller weight.

One obtains in this manner a mechanism which makes it possible to have an automatic height adjustment of the combine header and which besides the advantages as described above shows still other advantages such as: control simplicity, an inexpensive mechanism which does not require maintenance, limit of the control frequency of the hydraulic lift system, etc. The present invention is not limited to the execution described as an example and reflected in the enclosed drawings but such a height adjustment can be realized in all shapes and dimensions without having to leave the frame of the invention.

While the preferred structure in which the principles of the present invention have been incorporated is shown and described above, it is to be understood that the invention is not to be limited to the particular details, shown and described above, but that, in fact, widely different means may be employed in the practice of the broader aspects of the invention.

What is claimed is:

1. In combination with a harvesting mechanism having a frame adapted to be propelled forwardly over the ground and a forwardly extending straw elevator and header pivotally mounted on the frame, the combination therewith of mechanism operable to support and maintain the straw elevator and header on the ground in an equilibrium position with respect to the frame as the frame is propelled forwardly, said mechanism including slide shoes pivotally mounted underneath the header, first resilient means between the slide shoes and the header for pushing the slide shoes away from the header allowing the slide shoes to resiliently support part of the weight of the straw elevator and header, and second resilient means connected to the straw elevator and header for partially supporting the weight of the straw elevator and header, the first and second means being operatively responsive to the relative displacement between the slide shoes and header to automatically provide for equilibrium position of the header and straw elevator.

2. Mechanism according to claim 1, further characterized by the slide shoes being connected with an indication mechanism which is set up in the vicinity of the mechanism drivers seat.

3. Mechanism according to claim 1 in which said slide shoes include a number of slide members situated next to each other, each of which have a relatively wide and large surface.

4. Mechanism according to claim 1, further characterized by the rear part of each slide shoe being pivotally connected with one end of a vertical rod which is freely movably connected at its other end with the header.

5. Mechanism according to claim 4, in which said first resilient means is at least one compression spring provided between each slide shoe and the header.

6. Mechanism according to claim 5 in which the aforesaid spring is applied around the aforeaid vertical rod.

7. Mechanism according to claim 6, in which the compressive force of the aforesaid spring is adjustable.

8. Mechanism according to claim 4 in which an adjustable stop is provided on the aforesaid rod to limit the maximum deviation of the associated slide shoe toward the header.

9. Mechanism according to claim 1 further characterized by the slide shoes each being pivotally secured to a transversely placed shaft mounted on the straw elevator and header and disposed as close as possible behind a cutting mechanism on the header.

10. Mechanism according to claim 1, in which each slide shoe is connected with an indicator via a drawing pressure cable, the indicator being mounted in the steering column of the harvesting mechanism and can be displaced along a scale indication, and in which a cover of the cable is connected on one hand with the header and on the other hand with the aforesaid steering column.

11. Mechanism according to claim 1, in which two slide shoes are provided underneath the header.

12. Mechanism according to claim 1 further chracterized by the provision of lifting rams which are each connected at one end with a fixed part of the frame and at the other end with a lever mechanism on the straw elevator and header, a portion of the lever mechanism being connected via a tension spring with the rear part of the straw elevator housing.

13. Mechanism according to claim 12 in which the aforesaid lever mechanism includes two arms on a shaft and extending radially outwardly therefrom.

14. Mechanism according to claim 13 in which said shaft extends over the entire width of the machine underneath the straw elevator housing.

15. Mechanism according to claim 12, in which the tension of the aforesaid spring is adjustable.

Finally the mechanism is completed by an extra link 45 at each side pivotally connected with spindle 8 at one end. e other end of link 45 can be secured by fastener 46 with a support 47 which is provided for this purpose underneath the straw elevator.

* * * * *

UNITED STATES PATENT OFFICE
CERTIFICATE OF CORRECTION

Patent No. 3,747,311   Dated July 24, 1973

Inventor(s) Frans J. DeCoene and Marc G. Vansteelant

It is certified that error appears in the above-identified patent and that said Letters Patent are hereby corrected as shown below:

On the Title Page, please insert:

Foreign Application Priority Data

October 14, 1970    Belgium    50,518

Signed and sealed this 25th day of December 1973.

(SEAL)
Attest:

EDWARD M. FLETCHER, JR.          RENE D. TEGTMEYER
Attesting Officer                 Acting Commissioner of Patents